United States Patent
Khurana et al.

(10) Patent No.: US 11,023,977 B1
(45) Date of Patent: Jun. 1, 2021

(54) FINANCIAL FUTURE VISUALIZATION AND TRAINING

(71) Applicant: Wells Fargo Bank, N.A., San Francisco, CA (US)

(72) Inventors: Kav Khurana, Huntersville, NC (US); Christopher Nicholas Mair, Charlotte, NC (US); Claes Dahlstrand, Charlotte, NC (US); Lakshmi Kantamneni, Charlotte, NC (US); James E. Price, Bluffton, SC (US); Michael Edward Beaumont, Charlotte, NC (US); Gene C. Baker, Jr., Eldersburg, MD (US); Donald Nevills, Huntersville, NC (US); James D. Cahill, Belmont, MA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 503 days.

(21) Appl. No.: 15/176,565

(22) Filed: Jun. 8, 2016

(51) Int. Cl.
*G06Q 40/06* (2012.01)
*G06Q 40/02* (2012.01)
*G06T 19/00* (2011.01)
*G06F 3/0481* (2013.01)

(52) U.S. Cl.
CPC .......... *G06Q 40/06* (2013.01); *G06F 3/0481* (2013.01); *G06Q 40/02* (2013.01); *G06T 19/006* (2013.01)

(58) Field of Classification Search
CPC ...... G06Q 40/02; G06Q 40/06; G06T 19/006; G06F 3/0481
USPC ..................................................... 705/36 R
See application file for complete search history.

(56) References Cited

U.S. PATENT DOCUMENTS

| 5,774,878 | A | 6/1998 | Marshall | |
|---|---|---|---|---|
| 7,788,146 | B2 | 8/2010 | McCarthy, Jr. | |
| 8,024,213 | B1* | 9/2011 | Fano | G06Q 30/0201 |
| | | | | 705/1.1 |
| 8,321,316 | B1* | 11/2012 | Kunz | G06Q 40/02 |
| | | | | 705/35 |
| 8,374,940 | B1* | 2/2013 | Kunz | G06Q 40/06 |
| | | | | 705/36 R |
| 9,665,908 | B1* | 5/2017 | Kunz | G06Q 40/06 |

(Continued)

OTHER PUBLICATIONS

Fottrell, Quentin, "Will future Gordon Gekkos all look like this?", http://www.marketwatch.com/story/google-glass-buy-low-sell-eye-2013-08-13, MarketWatch, 2013.

*Primary Examiner* — Lindsay M Maguire
(74) *Attorney, Agent, or Firm* — Schwegman Lundberg & Woessner, P.A.

(57) ABSTRACT

A computer-implemented method, device, and system for communicating an impact of a financial decision or an investment strategy to a user through the use of virtual reality are provided. Providing a context for figuratively 'seeing and feeling' the results for a proposed financial strategy may assist the user in better understanding the impact of the financial strategy. Information provided in this context may educate the user with regards to the amount of income or savings required to achieve a goal over a time period. A goal for a user may be displayed as an image in a virtual reality scene based on gathered user information. The image representing the goal may be displayed according to a percent of clarity based on the financial amount needed to achieve the goal. The image may be changed based on the amount over a perceived virtual reality time period.

18 Claims, 5 Drawing Sheets

(56) References Cited

U.S. PATENT DOCUMENTS

| | | | |
|---|---|---|---|
| 9,852,470 B1* | 12/2017 | Kunz | G06Q 40/02 |
| 2009/0048981 A1* | 2/2009 | McBain Millan | G06Q 10/10 |
| | | | 705/36 R |
| 2012/0242696 A1 | 9/2012 | Martin | |
| 2014/0067634 A1* | 3/2014 | Sowder | G06Q 40/06 |
| | | | 705/35 |

* cited by examiner

```
┌─────────────────────────────────────────────┐
│   Receive information regarding a goal of a user │
│                      310                    │
└─────────────────────────────────────────────┘
                      ↓
┌─────────────────────────────────────────────┐
│        Receive information about the user   │
│                      320                    │
└─────────────────────────────────────────────┘
                      ↓
┌─────────────────────────────────────────────┐
│     Estimate a cost to achieve the goal for the user │
│                      330                    │
└─────────────────────────────────────────────┘
                      ↓
┌─────────────────────────────────────────────┐
│     Recommend a financial strategy for the user │
│                      340                    │
└─────────────────────────────────────────────┘
                      ↓
┌─────────────────────────────────────────────┐
│    Create a virtual reality scene based on a user profile │
│                      350                    │
└─────────────────────────────────────────────┘
                      ↓
┌─────────────────────────────────────────────┐
│  Display the goal in the virtual reality scene using a percent of │
│  clarity based on the financial strategy to achieve the goal │
│                      360                    │
└─────────────────────────────────────────────┘
                      ↓
┌─────────────────────────────────────────────┐
│  Change the virtual reality scene according to a perceived change in │
│      virtual reality time and any progress towards │
│       the user goal at the perceived virtual reality time │
│                      370                    │
└─────────────────────────────────────────────┘
                      ↓
┌─────────────────────────────────────────────┐
│  Recommend a modification to the user's financial strategy based │
│    on user feedback from using the virtual reality display │
│                      380                    │
└─────────────────────────────────────────────┘
```

FINANCIAL FUTURE VISUALIZATION AND TRAINING

TECHNICAL FIELD

The present application generally relates to a device, system, and computer-implemented method for use as a training tool in financial planning, more particularly to a device, system, and computer-implemented method for use in demonstrating an impact of a financial plan or strategy on a goal to a user through the use of virtual reality.

BACKGROUND

Communicating an effect of an investment or savings strategy to a client, or communicating the effect of not having an investment or savings strategy to a client, has been problematic in the financial industry. Numerical values are abstract to many clients and understanding the long term impact on an investment or savings strategy using numbers alone may provide limited guidance and understanding to client. Providing a client a context in which the client may better understand the impact of the proposed investment savings strategy would be helpful. Information provided in this context may assist the client in making financial planning decisions.

As a result, there is a need for a device, system, and computer-implemented method for use in more effectively communicating a financial strategy to a user.

SUMMARY OF THE INVENTION

Virtual reality, which can be referred to as immersive multimedia or computer-simulated reality, replicates an environment that simulates a physical presence in places in the real world or an imagined world, and allows the user to interact in that world. Virtual reality can be used to simulate a context that a user may relate to or is familiar with using virtual reality surroundings. Using this context, different simulation scenarios can be generated for a user. These simulation scenarios may be used, for example, to illustrate the financial impact of a goal on income or on savings growth over a period of time.

The present invention relates to a computer-implemented method, device, and system for demonstrating an impact of a goal on a financial (such as savings, investment, retirement, etc.) strategy to a user through the use of virtual reality. As a result, the user may better understand the impact of a financial decision on progress towards the goal of the user as well as the impact on the financial health of the user.

In an embodiment of the invention, a computer-implemented method comprises receiving a goal of the user; receiving information about the user; estimating, by a processor, a cost to achieve the goal; determining, by the processor, a financial strategy based on the user information to achieve the result; and displaying, using a virtual reality device, the result of the financial strategy. The result may illustrate any progress achieved toward the goal relative to the cost over-a period of time.

In an embodiment, the goal may comprise at least one an amount of retirement income, a change in a career, a change in a lifestyle, an amount needed to purchase an item, an amount needed for education, a relocation, and a combination thereof.

In an embodiment, the information about the user may comprise at least one of financial information, career information, financial risk tolerance, a lifestyle interest, user age, and a geographic preference.

In an embodiment of the method, the estimating of the cost to achieve the goal may comprise determining a market cost to achieve the goal. An amount the user has available to apply towards the goal may be determined based on the user information. The processor may then estimate a financial amount the user needs over the period of time to achieve the goal.

In an embodiment of the method, the displaying of the result may comprise creating a virtual reality scene based on the user information. The virtual reality scene may then be displayed to the user using the virtual reality device. The user goal may be displayed and/or represented as an image in the virtual reality scene. The image may represent the goal in the virtual reality scene based on a percent of clarity associated with the financial amount needed to achieve the goal. The image representing the goal may change over a perceived virtual reality time based on the financial amount needed to achieve the goal at the perceived virtual reality time. The image representing the goal may no longer change over the perceived virtual reality time when the financial amount needed to achieve the goal is zero.

In an embodiment, a system for displaying, using virtual reality, a result associated with a goal of a user and a financial strategy to achieve the goal is provided. The user may provide a goal to a computing device. Information about the user may be received using an application controlled by a computing device such as a processor. A processor may then estimate a cost to achieve the goal. The processor may determine a financial strategy based on the user information and/or the user goal. A virtual reality device may be configured to display the result for the investment strategy, wherein the result illustrates any progress achieved toward the goal relative to the cost over a period of time.

In an embodiment of the system, the goal may comprise at least one an amount of retirement income, a change in a career, a change in a lifestyle, an amount needed to purchase an item, an amount needed for education, a relocation, and a combination thereof.

In an embodiment of the system, the information about the user may comprise at least one of financial information, career information, financial risk tolerance, a lifestyle interest, user age, and a geographic preference.

In an embodiment of the system, the processor may estimate the cost to achieve the goal by determining a market cost to achieve the goal. An amount the user has available to apply towards the goal may be determined based on the user information. The processor may then estimate a financial amount the user needs over the period of time to achieve the goal.

In an embodiment of the system, the processor may be configured to create a virtual reality scene based on the user information. The virtual reality device may be configured to display the scene to the user using the virtual reality device. The user goal may be displayed and/or represented as an image in the virtual reality scene. The image may represent the goal in the virtual reality scene based on a percent of clarity associated with the financial amount needed to achieve the goal. The image representing the goal may change over a perceived virtual reality time based on the financial amount needed to achieve the goal at the perceived virtual reality time. The image representing the goal may no longer change over the perceived virtual reality time when the financial amount needed to achieve the goal is zero.

In an embodiment, a virtual reality device for displaying a result associated with a goal of a user and a financial strategy to achieve the goal is provided. The user may provide a goal to a processor in a virtual reality device.

Information about the user may be received using an application controlled by the processor in the virtual reality device. The processor may then estimate a cost to achieve the goal. The processor may determine a financial strategy based on the user information and/or the user goal. A display in the virtual reality device may be configured to display the result for the financial strategy, wherein the result illustrates a financial amount for the financial strategy relative to the cost of the goal over a period of time.

In an embodiment of the virtual reality device, the goal may comprise at least one an amount of retirement income, a change in a career, a change in a lifestyle, an amount needed to purchase an item, an amount needed for education, a relocation, and a combination thereof.

In an embodiment of the virtual reality device, the information about the user may comprise at least one of financial information, career information, financial risk tolerance, a lifestyle interest, user age, and a geographic preference.

In an embodiment of the virtual reality device, the processor may estimate the cost to achieve the goal by determining a market cost to achieve the goal. An amount the user has available to apply towards the goal may be determined based on the user information. The processor may then estimate a financial amount the user needs over the period of time to achieve the goal.

In an embodiment of the virtual reality device, the processor may be configured to create a virtual reality scene based on the user information. The display may be configured to display the scene to the user. The user goal may be displayed and/or represented as an image in the virtual reality scene. The image may represent the goal in the virtual reality scene based on a percent of clarity associate with the financial amount needed to achieve the goal. The image representing the goal may change over a perceived virtual reality time based on the financial amount needed to achieve the goal at the perceived virtual reality time. The image representing the goal may no longer change over the perceived virtual reality time when the financial amount needed to achieve the goal is zero.

Further areas of applicability of the present application will become apparent from the detailed description provided hereinafter. It should be understood that the detailed description and specific examples, while indicating the preferred embodiments of the application, are intended for purposes of illustration only and are not intended to limit the scope of the application.

BRIEF DESCRIPTION OF THE DRAWINGS

Having thus described some example embodiments in general terms, reference will now be made to the accompanying drawings, which are not necessarily drawn to scale, and wherein:

DETAILED DESCRIPTION

The following description of the embodiments of the present application is merely exemplary in nature and is in no way intended to limit the application, its application, or uses. The present application has broad potential application and utility, which is contemplated to be adaptable across a wide range of industries. For example, it is contemplated that financial services companies, insurance companies, and/or other institutions and individuals would have use for the present application. The following description is provided herein solely by way of example for purposes of providing an enabling disclosure but does not limit the scope or substance of the application.

Some example embodiments now will be described more fully hereinafter with reference to the accompanying drawings, in which some, but not all embodiments are shown. Indeed, the examples described and pictured herein should not be construed as being limiting as to the scope, applicability or configuration of the present disclosure. Like reference numerals refer to like elements throughout. Furthermore, as used herein, the term "or" is to be interpreted as a logical operator that results in true whenever one or more of its operands are true. As used herein, "operable coupling" should be understood to relate to direct or indirect connection that, in either case, enables at least a functional interconnection of components that are operably coupled to each other.

As used in herein, the terms "component," "module," and the like are intended to include a computer-related entity, such as but not limited to hardware, firmware, or a combination of hardware and software. For example, a component or module may be, but is not limited to being, a processor, a process running on a processor, an object, an executable program, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules.

Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Unless otherwise defined, all terms, including technical and scientific terms, used herein have the same meaning as commonly understood by one of ordinary skill in the art to which this present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present application relate to a device, system, and computer-implemented method for use in demonstrating an impact of a goal on a financial plan or strategy through the use of virtual reality and in demonstrating an impact of a financial decision on progress towards the goal through the use of virtual reality. Providing a user a context in which the user may figuratively 'see and feel' the results of a proposed financial decision may assist the user in better understanding its impact on the financial health of the user. For example, information provided in this context may assist the user in making retirement planning decisions. The device, system, and computer-implemented method of the present application may generate a financial strategy pertaining to a goal of an identified third party or client, referred to herein as a user. The device, system, and computer-implemented method of the present application may be used as a training tool to educate a user regarding the amount of income, investments and/or savings required to achieve a user goal over a period of time.

Figure 1:
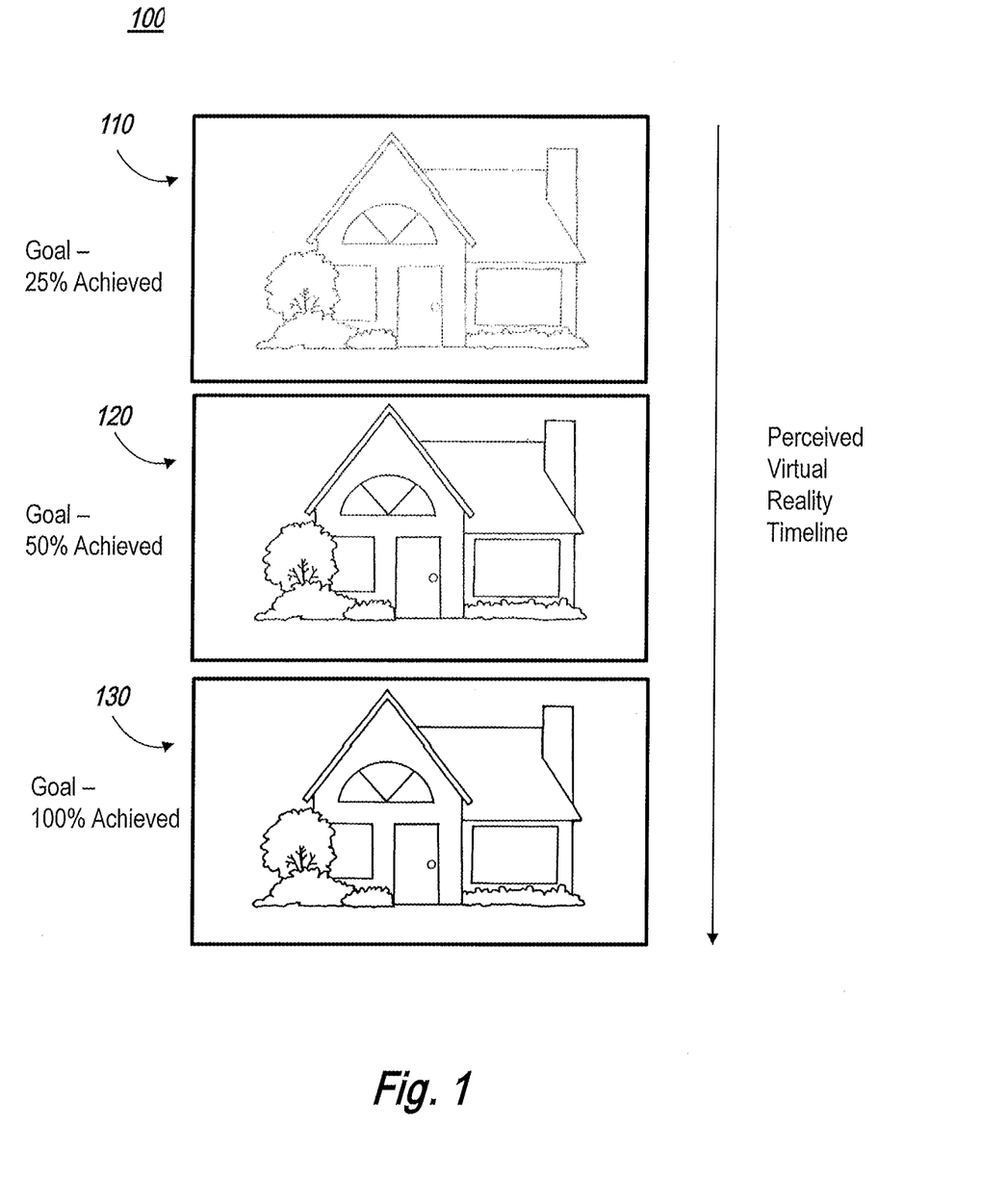
FIG. 1 depicts an example of a virtual reality display for communicating any progress towards a goal to a user.

FIG. 1 depicts an example virtual reality image, scene, and/or display 100 for visually demonstrating progress towards a goal to a user through the use of virtual reality. Virtual reality replicates an environment that simulates a physical presence in a place in the real world or an imagined world, and allows the user to interact in that world. Virtual reality can be used to simulate a context that a user may relate to or is familiar with, for example, a house, a vehicle, a location, a family situation, and/or a career path. The virtual reality image 100 may be generated based on information related to the user. For example, the user may have indicated the goal of owning a particular house at a particular location. Using virtual reality, an avatar representing the user may be placed in a virtual reality scene containing an item representing the goal for the user, for example, the particular house of interest to the user, thereby allowing the virtual reality scene to be personalized to the user.

In the virtual reality scene, the user goal may be displayed using an image. The image may represent the user goal in the virtual reality scene based on a percent of clarity associated with the financial amount needed to achieve the goal. The financial amount, for example, may come from retirement income. For example, if the user has 25% of the income or savings needed to achieve the goal, the image may be displayed with 25% percent of clarity 110. With regard to percent of clarity, the image may be shown, for example, as partially transparent, partially out of focus, partially pixilated, and the like. The image representing the goal may change over a perceived virtual reality time based on the amount needed to achieve the goal at the perceived virtual reality time. For example, if at some later perceived virtual reality or actual time the user has amassed 50% of the retirement amount needed to achieve the goal, the image may be displayed with 50% percent of clarity 120. The image representing the goal may no longer change over the perceived virtual reality time when the amount needed to achieve the goal is zero. Thus, at some later perceived virtual reality time when the user has accumulated 100% of the amount needed to achieve the goal, the image may be displayed with 100% percent of clarity 130.

Figure 2:
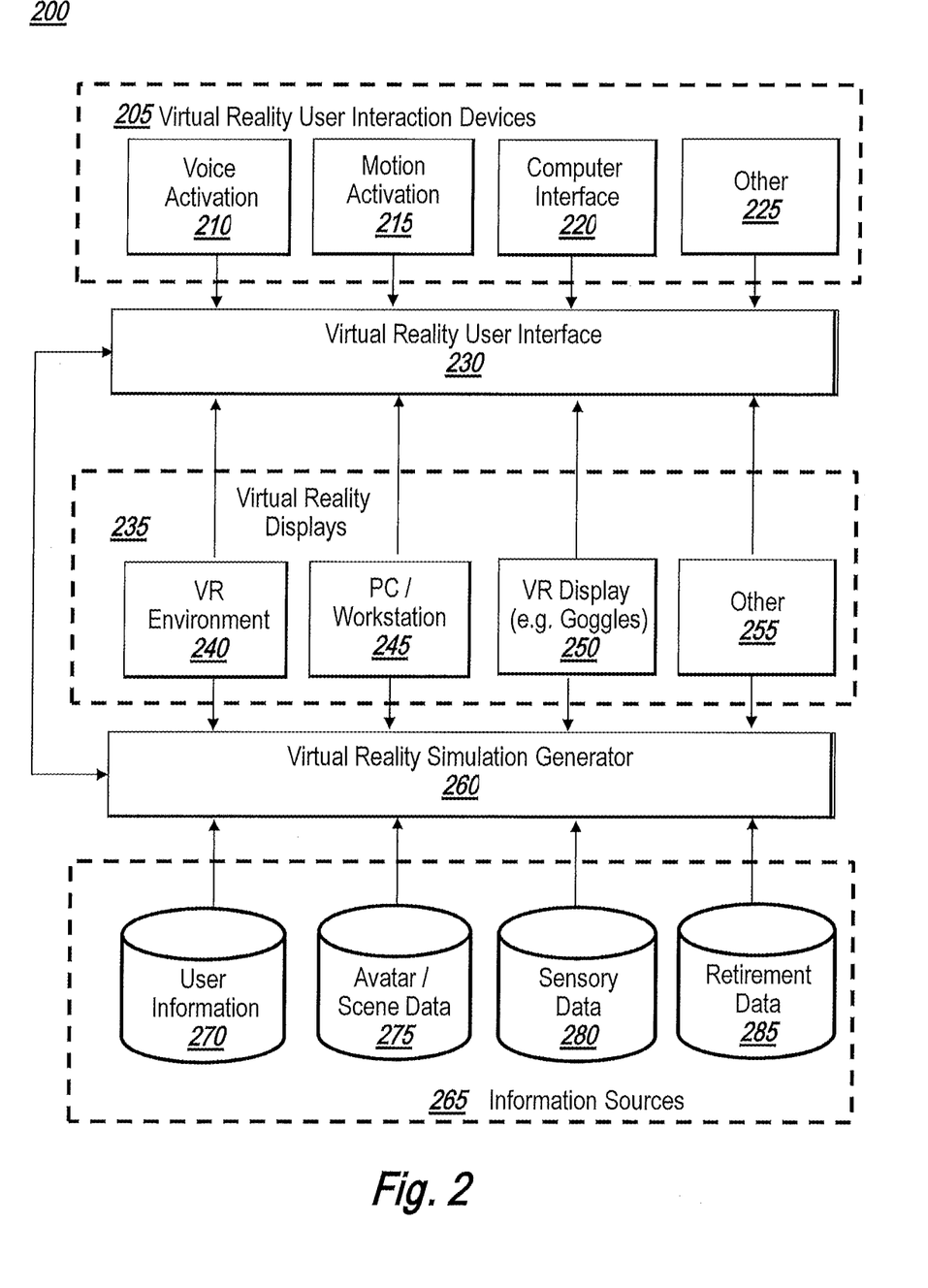
FIG. 2 depicts an example system for communicating any progress towards a goal to a user through the use of virtual reality.

FIG. 2 depicts an example system for communicating any progress towards a goal to a user through the use of virtual reality. FIG. 2 illustrates an exemplary collection of virtual reality display platforms 235, virtual reality user interaction devices 205, and virtual reality information sources 265 used to generate and present one or more virtual reality simulations of an avatar or population of avatars interacting with and displaying a user goal based on a financial strategy for the user. The user interaction devices 205 may allow a user to interact with elements of the virtual reality simulation. As shown, the virtual reality user interaction input devices 205 may include a voice activated system 210, a motion sensing device 215 typically worn by a user, for example, a set of motion sensing gloves and/or goggles, a computer interface 220 such as mouse, keyboard, and/or touch screen device, and/or other user interface device 225. Of course, depending on how a virtual reality simulation is presented to the user, the particular virtual reality user interaction devices 205 may be tailored to suit the needs of an individual user.

In various embodiments, different virtual reality display platforms 235 may used to present a user with a virtual reality simulation of an avatar interacting with a financial result, such as displaying the result towards achieving a goal at the perceived virtual reality time. By creating simulations involving the goal for a user, the impact of a financial strategy or the impact of a financial decision to the user may be enhanced and/or may become more memorable to the user. This may allow the user to make better investment and savings decisions, for example. The virtual reality user interaction devices 205 may interact with the virtual reality display platforms 235 via a virtual reality user interface 230. The virtual reality user interface 230 may comprise a communication interface, for example, a wireless connection or a wired connection.

A virtual reality display platform 235 may include a virtual reality cube, sphere, and/or a virtual reality (VR) environment 240, for example a "Cave Automatic Virtual Environment" (CAVE). The virtual reality display platform 235 may include a personal computer (PC) and/or a workstation 245 which contains, for example, a liquid crystal display, cathode ray tube, or light emitting display. The virtual reality display platform 235 may include a head-mounted virtual reality display 250, for example, virtual reality goggles worn by the user. The virtual reality display platform 235 may include another display device 255, for example, a mobile phone, laptop computer, and/or other virtual reality display platform depending on how a virtual reality simulation is presented to the user. Of course, embodiments of the application are not limited to these virtual reality display platforms, and may be adapted for use with other existing platforms as well as new ones that become available.

A CAVE environment provides immersive virtual environment where a user may interact with a virtual reality system inside a room where projectors are directed to, for example, three, four, five, or six of the walls of a cube. The images may be in stereo requiring stereo shutter glasses to be worn. Presenting a user with a simulation experience using a virtual reality CAVE may provide the user with a fully immersive visualization experience where the screens of the CAVE provide the user with an entirely visual, and possibly other sensory, experience.

A head mounted VR display 250, such as a virtual reality helmet or three dimensional (3D) goggles, may provide an immersive virtual environment for presenting a simulation of an avatar, or a population of avatars, interacting with the result of a financial decision or a financial strategy towards achieving a goal at the perceived virtual reality time.

A virtual reality simulation generator 260 may be configured to generate a simulation presented on the one or more of display platforms 235 based on simulation data from one or more information sources 265. FIG. 2 illustrates a number of exemplary information sources 265 that may be used to provide information for a user specific simulation. As shown, the one or more information sources 265 may include user information 270, avatar and/or scene data 275, sensory data 280, and/or other retirement related data 285, from a plurality of sources such as the internet and/or social media.

The system, virtual reality device, and/or a processor may gather user information 270 based on a plurality of data sources, for example, from the user, user accounts, the user's employer, private networks, and/or public networks such as the internet. User information 270 may comprise personal information for the user, for example, the user's age and/or user life events such as a wedding, family planning, retirement interests, and/or educational interests for the user and/or the user's dependents. User information 270 may comprise a user provided goal, for example, a retirement goal, a life goal, an income goal, and/or an asset goal. User information 270 may comprise financial information, for example bank accounts, investment accounts, retirement accounts, user income, and/or estimated user income potential. User information 270 may comprise information on the user's financial risk tolerance. User information 270 may comprise user asset related information, for example information on a business, a property, and/or an asset such as a vehicle. User information 270 may comprise expense related information, for example, a fixed expense, purchase history data, and/or an anticipated expense. User information 270 may comprise work related information, for example, information pertaining to the user's career and/or current job. User information 270 may comprise geographic related information, for example, user travel data, a geographic preference, and/or a preferred retirement location. The user information 270 may comprise user lifestyle information and/or demographic preferences, for example, user preferred entertainment, a social media interest, a hobby, and/or a user's interest. The user information 270 may comprise a user's social media interest, for example, social media commentary, a posting, online activity, and/or research on potential assets to be acquired. Information and data associated with the user is input into the processor and aggregated together to generate a user profile.

Avatar and/or scene data 275 may include data related to the body shape, size, mass, volume, structure, position, movement, and/or other characteristics of a user's body. The actual data may be tailored to suit the needs of a particular case. The avatar and/or scene data 275 may be generated using information from the user information 270.

In one embodiment, the virtual reality simulation generator 260 may be augmented using other sensory data 280. For example, in addition to visual aspects of a virtual reality simulation for a financial strategy towards achieving a goal at the perceived virtual reality time, a multi-sensory simulation may be generated, comprising, for example, simulations of sights, sounds, tactile responses, and/or tastes. Thus, a variety of aspects such as sounds, smells, and actions resulting from a user's interaction with the displayed result towards achieving a goal at the perceived virtual reality time may be included in a virtual reality simulation.

In one embodiment, a virtual reality simulation may be augmented using retirement Data 285. For example, the retirement data 285 may comprise, for example, an anticipated cost for an item, projected social security and/or pension income, a projected lifetime for the user, projected population numbers, projected environment data, and the like. The retirement data 285 may be obtained from a plurality of sources, for example, the internet, social media, financial institutions, and/or government reports.

Figure 3:
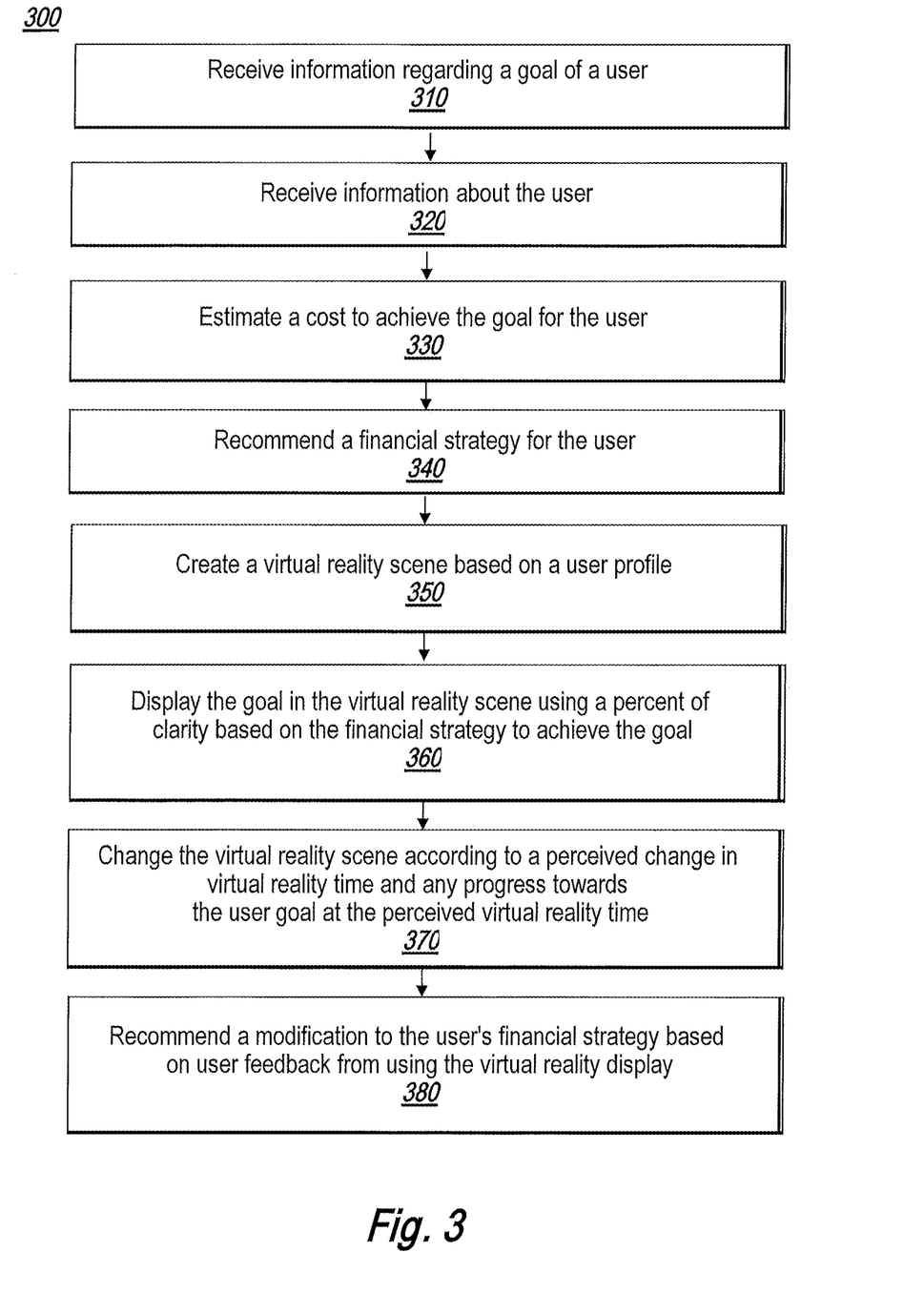
FIG. 3 depicts a flowchart diagram describing an exemplary method for communicating an impact on a goal to a user through the use of virtual reality.

FIG. 3 depicts a flowchart diagram describing an exemplary method 300 for demonstrating an impact of a financial decision or a financial strategy on a goal to a user through the use of virtual reality. In accordance with the present application, the method 300 comprises, at step 310, receiving information regarding a goal of a user and/or for a user. The user goal may include, but is not limited to, at least of one of retirement income, business income, net worth, a change in a career, a change in a lifestyle, a house, and a relocation. The user goal may comprise an investment strategy related to retirement income growth for the user. The user goal may include a specific item, for example, a retirement objective, a home, a vacation, a vehicle, a business, and/or a hobby. The user goal user may comprise a short term goal and/or a long term goal. The user goal may be seen as easy to achieve or may be deemed difficult to achieve. The user goal may be considered low risk or high risk.

At step 320, information about the user is received. The gathered user information and/or user goal may be referred to as a user profile. The user profile may be generated by inputting information directly into an application being controlled by a processor in a computing device. For example, the processor may provide the user with a series of questions in the form of a questionnaire. The information of the user may be gathered indirectly from another computer system or individual, for example, through a financial planner or advisor.

The system, virtual reality device, and/or a processor may gather user information from a plurality of data sources, for example, from the user, a user account, a user financial record, the user's employer, a private network, and/or a public network such as the internet or social media channels. The user information may comprise user personal information, for example, the user's age and/or user life events such as a wedding, a family planning interest, a retirement interest, and/or an educational interest of the user and/or a user's dependent. The user information may comprise a user goal, for example, a retirement goal, a life goal, an income goal, and/or an asset goal. The user information may comprise financial information, for example information from a bank account, an investment account, a retirement account, user income, and/or estimated user income potential. The user information may comprise information on the user's financial risk tolerance. The user information may comprise user asset related information, for example information on a business, a property, and/or a vehicle. The user information may comprise expense related information, for example, a fixed expense, purchase history data, and/or an anticipated expense. The user information may comprise work related information, for example, information pertaining to the user's career and/or current job. The user information may comprise geographic related information, for example, user travel data, a geographic preference, and/or a preferred retirement location. The user information may comprise user lifestyle information and/or demographic preferences, for example, user preferred entertainment, hobbies, and/or a user's interest. The user information may comprise information on a user social media interest, for example, social media commentary, postings, online activity, and/or research on potential assets to be acquired. Information and data associated with the user is input into the processor and compiled to build a user profile using the processor.

At step 330, system, virtual reality device, and/or a processor may estimate a cost to achieve the goal for the user. The estimated cost may be extrapolated over time based on the user information. The cost to achieve the goal may be obtained from a plurality of sources. For example, the plurality of data sources may comprise internet information, manufacturer information, and/or social media commentary by one or more individuals who have knowledge of the goal for the user. Internet information may comprise, for example, market price to achieve the goal, a historical cost estimate, and/or additional related information. Manufacturer information may comprise, for example, information on a manufacturer's suggested retail price and/or additional related information. Social media commentary may comprise, for example, user opinions related to the cost of the goal.

At step 340, system, virtual reality device, and/or a processor may recommend an investment strategy for retirement income growth over a period of time to the user. The investment strategy recommended may include an investment strategy for retirement, for example, a savings plan, an individual retirement account, and/or an asset allocation based the user information and/or the user goal. If the recommend strategy does not achieve the goal for the user, a shortfall amount needed to satisfy the goal for the user is determined.

At step 350, system, virtual reality device, and/or a processor may create a virtual reality scene based on the user profile. The virtual reality scene may comprise user information which places the user viewing the virtual reality scene in a familiar context. For example, the virtual reality scene may display an avatar that looks similar to the user. The virtual reality scene may display an asset such as a home and/or vehicle that is similar to the user's goal. The virtual reality scene may display anticipated future life events based on the user information, for example, obtaining an asset, a marriage, a career path, an education, a child, a family, and/or a relocation.

The processor and/or a virtual reality generator may create a virtual reality scene using information from a third party source, for example, the internet. The virtual reality scene may be created using information related to the user information and/or a user's goal. For example, information from social media may be used where related to the user and/or the user's goal to provide a more realistic virtual reality scene to the user.

At step 360, the processor and/or a virtual reality generator may display the goal in the virtual reality scene using a percent of clarity based on the shortfall to achieve the goal. For example, a user might have a goal to acquire an item, for example, a boat at a future time when retired, but has currently only saved 30% of the funds needed to buy the boat. As a result, the boat may be shown with 30% clarity in the virtual reality image displayed at the current time in the virtual reality scene.

At step 370, the processor and/or a virtual reality generator may change the virtual reality scene according to a perceived change in time. For example, the avatar representing the user may be changed to reflect the appropriate age of the user at the perceived time. The percent of clarity for a goal may be changed based on any progress achieved toward the goal or on an estimated amount of shortfall in the financial strategy to achieve the goal at the perceived time. As the user becomes closer the achieving the desired goal over a perceived virtual reality time period, the percent of clarity for the goal may increase, solidifying the goal and/or the image representing the goal in the virtual reality display. For example, a user might have a goal to buy, for example, a boat at a future time when retired, but is currently tracking to have saved only 60% of the funds needed to buy the boat at the future time. As a result, the boat may be shown at 60% clarity in the virtual reality display at the perceived future virtual time. Once the user achieves the goal, for example, the shortfall needed to meet the goal is zero and/or the goal has been achieved by other means, the percent of clarity for a goal becomes 100%, for example, the image representing the goal may be clearly provided and/or may be displayed as being solid.

At step 380, the processor may track a user's reaction to changes in the virtual reality scene over the perceived virtual reality time period. The processor and/or a virtual reality generator may recommend a modification to the user's investment strategy based on the user's reaction and/or on feedback from the user after using virtual reality to assess the impact of an investment plan or strategy for retirement income growth and stabilization. For example, the user may indicate the desire to achieve a goal earlier in time, thus resulting in a more aggressive investment strategy.

The processor may provide the user with a plurality of steps for implementing a change in the financial strategy to the user. The plurality of steps for implementing the recommendation may comprise recommending an alternative investment strategy and/or a savings option to achieve a modified goal for the user. For example, the processor may recommend the user speak with a financial advisor about alternate retirement income options available to the user.

The processor and/or a virtual reality generator may create an output such as a report or a profile for the user as a take-away after using the virtual reality system and/or device. For example, the report or profile may provide a user with a financial roadmap and the user may periodically check in and rerun the virtual reality simulation and/or update the financial roadmap based on a change in the user information and/or a user's goal.

Figure 4:
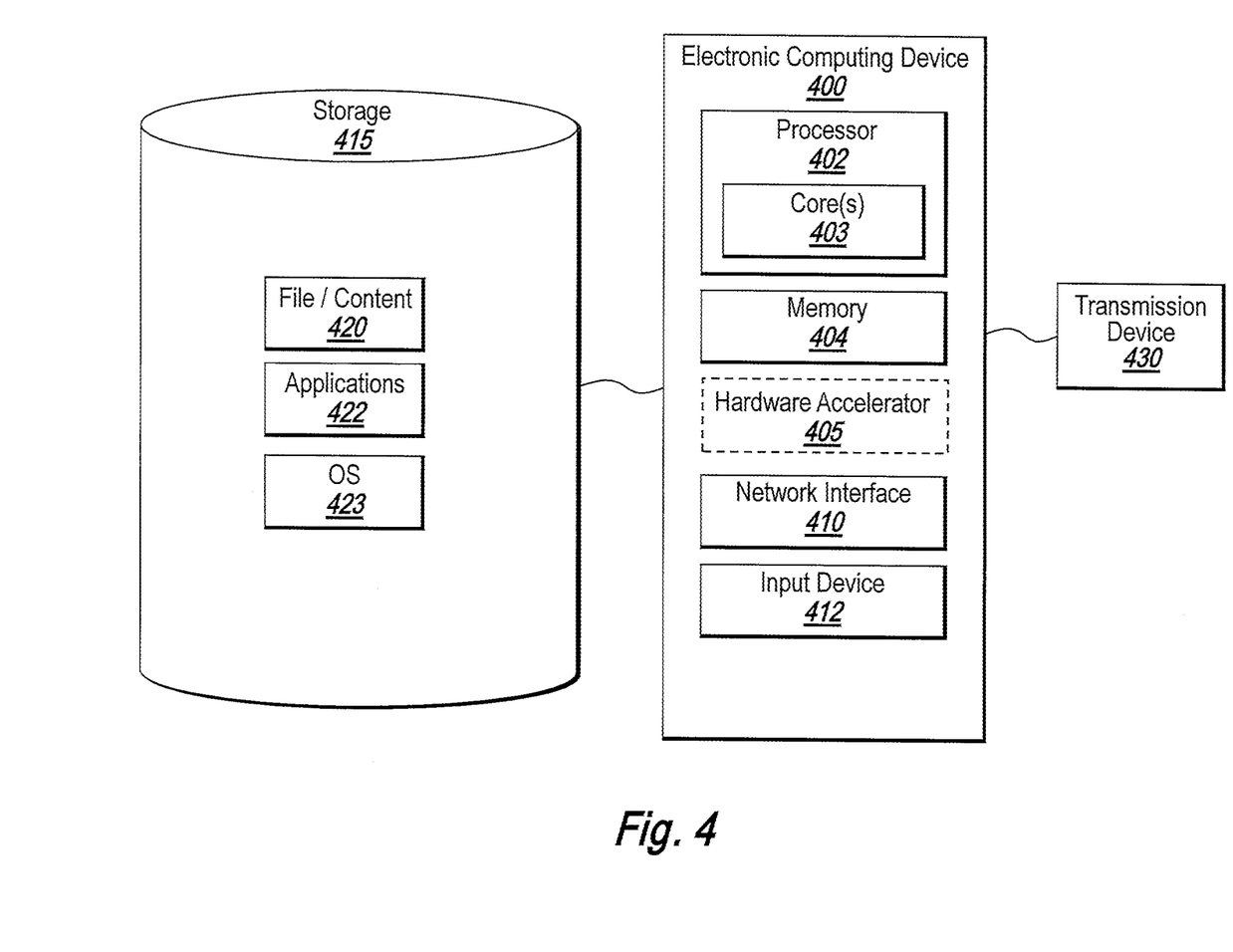
FIG. 4 is a schematic depiction of a computing device suitable for use with example embodiments of the present application.

FIG. 4 depicts an example of an electronic device, computing device, and/or processing device 400 suitable for use with one or more embodiments of the present application. The electronic computing device 400 may be located in networked computer system.

The electronic device 400 may take many forms, including but not limited to a computer, workstation, server, network computer, quantum computer, optical computer, Internet appliance, mobile device, a pager, a tablet computer, a smart sensor, application specific processing device (ASIC), a processing device containing a processor, etc.

The electronic device 400 is illustrative and may take other forms. For example, an alternative implementation of the electronic device 400 may have fewer components, more components, or components that are in a configuration that differs from the configuration of FIG. 4. The components of FIG. 4 and/or other figures described herein may be implemented using hardware based logic, software based logic and/or logic that is a combination of hardware and software based logic (e.g., hybrid logic); therefore, the components illustrated in FIG. 4 and/or other figures are not limited to a specific type of logic.

The processor 402 may include hardware based logic or a combination of hardware based logic and software to execute instructions on behalf of the electronic device 400. The processor 402 may include logic that may interpret, execute, and/or otherwise process information contained in, for example, the memory 404. The processor 402 may be made up of one or more processing cores 403. The information may include computer-executable instructions and/or data that may implement one or more embodiments of the application. The processor 402 may comprise a variety of homogeneous or heterogeneous hardware. The hardware may include, but is not limited to, a combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Moreover, the processor 402 may include a system-on-chip (SoC) or system-in-package (SiP). One or more processors 402 may reside in the electronics device 400. An example of a processor 402 is the Intel® Core i3 series of processors available from Intel Corporation, Santa Clara, Calif.

The electronic device 400 may include, but is not limited to, one or more tangible non-transitory computer-readable storage media for storing one or more computer-executable instructions or software that may implement one or more embodiments of the application. The non-transitory computer-readable storage media may be, for example, the memory 404 or the storage 415. The memory 404 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 400 may include a virtual machine (VM) 406 for executing the instructions loaded in the memory 404. A virtual machine 406 may be provided to handle a process running on multiple processors so that the process may appear to be using only one computing resource rather than multiple computing resources. Virtualization may be employed in the electronic device 400 so that infrastructure and resources in the electronic device may be shared dynamically. Multiple VMs 406 may be resident on a single computing device 400.

A hardware accelerator 405 may be implemented in an ASIC, FPGA, or some other device. The hardware accelerator 405 may be used to reduce the general processing time of the electronic device 400.

The electronic device 400 may include a network interface 410 to interface to a Local Area Network (LAN), Wide Area Network (WAN), Ethernet domain, and/or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 502.11), RF connections, high-speed interconnects (e.g., InfiniBand, gigabit Ethernet, Myrinet) or some combination of any or all of the above. The network interface 410 may include a built-in network adapter, network interface card, personal computer memory card international association (PCMCIA) network card, card bus network adapter, wireless network adapter, universal serial bus (USB) network adapter, modem or any other device suitable for interfacing the electronic device 400 to any type of network capable of communication and performing the operations described herein.

The electronic device 400 may include one or more user input devices 412, for example a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 400 may include other suitable I/O peripherals.

The input devices 412 may allow a user to provide input that is registered on a visual display device 414. A graphical user interface (GUI) 416 may be shown on the display device 414.

A storage device 415 may also be associated with the computer 400. The storage device 415 may be accessible to the processor 402 via an I/O bus. The information in the storage device 415 may be executed, interpreted, manipulated, and/or otherwise processed by the processor 402. The storage device 415 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the application.

The storage device 415 may store any modules, outputs, displays, files, content, and/or information 420 provided in example embodiments. The storage device 415 may store applications 422 for use by the computing device 400 or another electronic device. The applications 422 may include programs, modules, or software components that allow the electronic device 400 to perform tasks. Examples of applications include a questionnaire program to allow a user to input user information, a data mining application to obtain user information for a data source, word processing software, shells, Internet browsers, productivity suites, and programming software. The storage device 415 may store additional applications for providing additional functionality, as well as data for use by the computing device 400 or another device. The data may include files, variables, parameters, images, text, and other forms of data.

The storage device 415 may further store an operating system (OS) 423 for running the computing device 400. Examples of OS 423 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

A transmission device 430 may also be associated with the computer 400. The transmission device 430 may be capable of transmitting and receiving information over radio frequencies using common protocols and/or transmitting and receiving information over Ethernet domains using internet devices. A transmission device 430 may be device comprising a media access controller, for example, an internet PHY device.

One or more embodiments of the application may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

One or more embodiments of the application may be implemented in a programming language. Some examples of languages that may be used include, but are not limited to, Python, C, C++, C#, Java, JavaScript, a hardware description language (HDL), unified modeling language (UML), and Programmable Logic Controller (PLC) languages. Further, one or more embodiments of the application may be implemented in a hardware description language or other language that may allow prescribing computation. One or more embodiments of the application may be stored on or in one or more mediums as object code. Instructions that may implement one or more embodiments of the application may be executed by one or more processors. Portions of the application may be in instructions that execute on one or more hardware components other than a processor.

Figure 5:
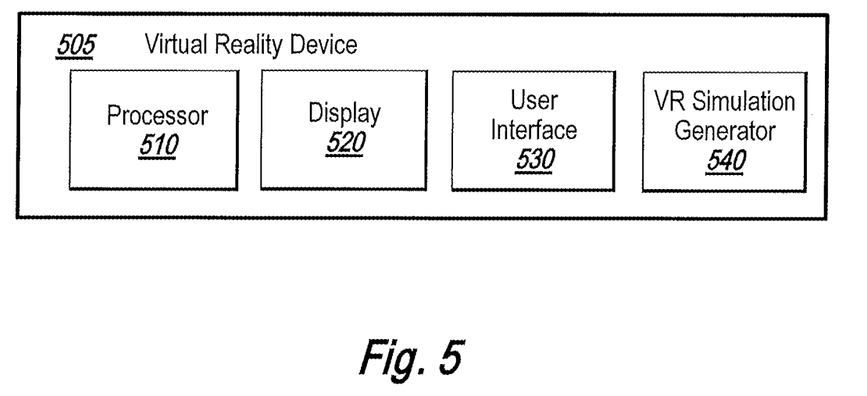
FIG. 5 is a schematic depiction of a virtual reality device suitable for use with example embodiments of the present application.

FIG. 5 is a schematic depiction of a virtual reality device 505 suitable for use with example embodiments of the present application. The virtual reality device 505 may comprise a processor 510, a display 520, a user interface 530, and/or a virtual reality (VR) generator 540. The virtual reality device 505 may communicate an impact of a financial decision or a financial strategy to a user through the use of a virtual reality image on a virtual reality display 520. The virtual reality simulation generator 540 may be configured to generate a simulation based on simulation data from one or more information sources. The processor may be configured to operate the display 520, receive an input, and provide data to a user via a user interface 530.

It is understood that the present application may be implemented in a distributed or networked environment. For example, information may be provided and manipulated at a central server, while a user interacts with the information through a terminal or input/output device.

Many modifications and other examples of the embodiments set forth herein will come to mind to one skilled in the art to which these embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

It is intended that the present application not be limited to the particular embodiments disclosed above, but that the present application will include any and all particular embodiments and equivalents falling within the scope of the following appended claims.

That which is claimed:

1. A computer-implemented method comprising:
   receiving a goal of a user;
   gather information about the user from a plurality of data sources, wherein the information gathered about the user includes social commentary, postings, online activity, and user opinions related to a cost of the goal;
   estimating, by a processor, the cost to achieve the goal, the cost extrapolated over time based on the user information;
   determining, by the processor, a financial strategy based on the user information and the cost to achieve the goal;
   displaying to the user, using a virtual reality device, an image representing the goal at a current time in a virtual reality scene, wherein the image is rendered out of focus by pixilating the image based on a current deficit between the cost and current user resources identified from the information about the user;
   rendering an avatar of the user in the virtual reality scene using characteristics of the user selected based on the goal;
   re-rendering to the user, using the virtual reality device, the image representing the goal at the current time to an image representing the goal at a future time by decreasing the pixilation to present the image more in focus than the out of focus rendered image based on a future deficit between the cost and future user resources reflected by a result of the financial strategy relative to the cost over a period of time between the current time and the future time;
   tracking a reaction of the user to the re-rendering of the image; and
   recommending to the user a modification to the financial strategy based on the tracked reaction of the user to the re-rendering of the image.

2. The method according to claim 1, wherein the goal includes at least one of an amount of retirement income, a change in a career, a change in a lifestyle, an amount needed to purchase an item, an amount needed for education, or a relocation.

3. The method according to claim 1, wherein estimating of the cost to achieve the goal comprises:
   determining a market cost to achieve the goal;
   determining an amount the user has available to apply towards the goal based on the user information; and
   estimating a financial amount the user needs over the period of time to achieve the goal.

4. The method according to claim 1, wherein the image representing the goal is rendered in focus over a perceived virtual reality time when the future deficit is zero.

5. The method according to claim 1, wherein the plurality of data sources include two or more of the user, user accounts, an employer of the user, a private network, or the internet.

6. The method according to claim 1, wherein the information gathered about the user further includes at least one of personal information about the user, financial information, a financial risk tolerance of the user, expense related information, work related information, geographic related information, or lifestyle information.

7. A system comprising:
   a processor configured to:
      receive a goal from a user;
      gather information about the user from a plurality of data sources, wherein the information gathered about the user includes social commentary, postings, online activity, an user opinions related to a cost of the goal;
      estimate the cost to achieve the goal, the cost extrapolated over time based on the user information; and
      determine an investment strategy based on the user information and the cost to achieve the goal; and
   a virtual reality device configured to:
      display, to the user, an image representing the goal at a current time in a virtual reality scene, wherein the image is rendered out of focus through pixilation of the image based on a current deficit between the cost and current user resources identified from the information about the user;
      render an avatar of the user in the virtual reality scene using characteristics of the user selected based on the goal;
      re-render, to the user, the image representing the goal at the current time to an image representing the goal at a future time through reduction of the pixilation to present the image more in focus than the out of focus rendered image based on a future deficit between the cost and future user resources reflected by a result for the investment strategy relative to the cost over a period of time between the current time and the future time, wherein the processor is further configured to:
         track a reaction of the user to the re-rendering of the image; and
         recommend to the user a modification to the investment strategy based on the tracked reaction of the user to the re-rendering of the image.

8. The system according to claim 7, wherein the goal includes at least one of an amount of retirement income, a change in a career, a change in a lifestyle, an amount needed to purchase an item, an amount needed for education, or a relocation.

9. The system according to claim 7, wherein, when estimating of the cost to achieve the goal, the processor is further configured to:
   determine a market cost to achieve the goal;
   determine an amount the user has available to apply towards the goal based on the user information; and
   estimate a financial amount the user needs over the period of time to achieve the goal.

10. The system according to claim 7, wherein the image representing the goal is rendered in focus over a perceived virtual reality time when the future deficit is zero.

11. The system according to claim 7, wherein the plurality of data sources include two or more of the user, user accounts, an employer of the user, a private network, or the internet.

12. The system according to claim 7, wherein the information gathered about the user further includes at least one of personal information about the user, financial information, a financial risk tolerance of the user, expense related information, work related information, geographic related information, or lifestyle information.

13. A virtual reality device comprising:
   a processor configured to:
      receive a goal of a user;
      gather information about the user from a plurality of data sources, wherein the information gathered about the user includes social commentary, postings, online activity, an user opinions related to a cost of the goal;
      estimate the cost to achieve the goal; and
      determine a financial strategy based on the user information, the cost extrapolated over time based on the user information; and
   a display configured to:
      display, to the user, an image representing the goal at a current time in a virtual reality scene, wherein the image is rendered out of focus through pixilation of the image based on a current deficit between the cost and current user resources identified from the information about the user;
      render an avatar of the user in the virtual reality scene using characteristics of the user selected based on the goal;
      re-render, to the user, the image representing the goal at the current time to an image representing the goal at a future time through reduction of the pixilation to present the image more in focus than the out of focus rendered image based on a future deficit between the cost and future user resources reflected by a result for the financial strategy relative to the cost over a period of time between the current time and the future time, wherein the processor is further configured to:
         track a reaction of the user to the re-rendering of the image; and
         recommend to the user a modification to the financial strategy based on the tracked reaction of the user to the re-rendering of the image.

14. The virtual reality device according to claim 13, wherein the goal includes at least one of an amount of retirement income, a change in a career, a change in a lifestyle, an amount needed to purchase an item, an amount needed for education, or a relocation.

15. The virtual reality device according to claim 13, wherein, when estimating of the cost to achieve the goal, the processor is further configured to:
   determine a market cost to achieve the goal;
   determine an amount the user has available to apply towards the goal based on the user information; and
   estimate a financial amount the user needs over the period of time to achieve the goal.

16. The virtual reality device according to claim 13, wherein the image representing the goal is rendered in focus over a perceived virtual reality time when the future deficit is zero.

17. The virtual reality device according to claim 13, wherein the plurality of data sources include two or more of the user, user accounts, an employer of the user, a private network, or the internet.

18. The virtual reality device according to claim 13, wherein the information gathered about the user further includes at least one of personal information about the user, financial information, a financial risk tolerance of the user, expense related information, work related information, geographic related information, or lifestyle information.

* * * * *

UNITED STATES PATENT AND TRADEMARK OFFICE
CERTIFICATE OF CORRECTION

PATENT NO. : 11,023,977 B1  
APPLICATION NO. : 15/176565  
DATED : June 1, 2021  
INVENTOR(S) : Khurana et al.

Page 1 of 1

It is certified that error appears in the above-identified patent and that said Letters Patent is hereby corrected as shown below:

In the Claims

In Column 15, Line 21, in Claim 7, delete "an" and insert --and-- therefor

In Column 16, Line 18, in Claim 13, delete "an" and insert --and-- therefor

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*